(12) United States Patent
Kim et al.

(10) Patent No.: US 8,568,244 B2
(45) Date of Patent: Oct. 29, 2013

(54) TRIPOD CONSTANT VELOCITY JOINT

(75) Inventors: Tae Hong Kim, Suwon-si (KR); Hun Hee Lee, Seoul (KR); Il Hun Ryu, Farmington Hills, MI (US); Jose Da Silva, Toledo, OH (US)

(73) Assignee: Hyundai Wia Corporation (KR)

( * ) Notice: Subject to any disclaimer, the term of this patent is extended or adjusted under 35 U.S.C. 154(b) by 83 days.

(21) Appl. No.: 13/023,837

(22) Filed: Feb. 9, 2011

(65) Prior Publication Data
US 2012/0202606 A1 Aug. 9, 2012

(51) Int. Cl.
*F16D 3/205* (2006.01)
(52) U.S. Cl.
USPC ............................................ 464/111; 464/905
(58) Field of Classification Search
USPC .................... 464/111, 123, 124, 905
See application file for complete search history.

(56) References Cited

U.S. PATENT DOCUMENTS 7,118,485 B2 * 10/2006 Sugiyama et al. ............ 464/111
2006/0205521 A1 9/2006 Yoon

FOREIGN PATENT DOCUMENTS

KR 10-0614001 B1 8/2006

* cited by examiner

*Primary Examiner* — Gregory Binda
(74) *Attorney, Agent, or Firm* — Park & Associates IP Law, P.C.

(57) ABSTRACT

A constant velocity joint for a drive system comprises: a tripod housing coupled to the first rotating shaft and having a plurality of guide grooves therein, each guide groove extending in an axial direction of the tripod housing; a spider coupled to the second rotating shaft and having a plurality of trunnions, each trunnion positioned in a corresponding guide groove of the tripod housing; and a spherical roller disposed between the trunnion and the guide groove of the tripod housing, and a plurality of needle rollers disposed between the trunnion and spherical roller. Each spherical roller is in angular contact with the guide groove of the tripod housing with two contact points displaced relative to a pitch circle diameter line of the tripod housing. The ratio of the length (CL) between two contact points of tripod housing groove to the length (SL) between two edges of spherical roller is between 0.5 and 0.85, and the ratio of the radius (TGR2) of the guide groove of the tripod housing to the radius (SRR) of the spherical roller is between 1.1 and 1.4.

12 Claims, 9 Drawing Sheets

$0.5 \leq CL/SL \leq 0.85$
$1.1 \leq TGR2/SRR \leq 1.4$ $0.5 \leq NL/STD \leq 0.6$ $0.5 \leq CL/SL \leq 0.85$
$1.1 \leq TGR2/SRR \leq 1.4$ $0.5 \leq NL/STD \leq 0.6$

SIL/NL ≥ 0.9
0.25 ≤ SW/SOD ≤ 0.35

$0.75 \leq STH/STD \leq 0.85$
$0.77 \leq STD/SMD \leq 0.82$ $0.55 \leq SMD/SBD \leq 0.58$ $0.76 \leq STD/SBL \leq 0.80$ $1.10 \leq SMD/PCR \leq 1.20$
$0.76 \leq SMD/STR \leq 0.82$
$0.51 \leq SMD/TBD \leq 0.53$
$0.73 \leq SMD/TIR \leq 0.77$

TRIPOD CONSTANT VELOCITY JOINT

FIELD OF THE INVENTION

The present invention relates to a constant velocity joint of tripod type, also known as a tripod joint or tripod constant velocity joint, which is disposed between a drive shaft and a driven shaft coupled to each other and typically used in a drive axle of, for example, an automobile or other apparatus or machines for transmitting rotational torque between the rotating shafts of the same.

BACKGROUND OF THE INVENTION

Tripod type constant velocity joints are well known in the automobile industry, for example, as one type of constant velocity joints used in the drive system of automobiles to transfer a uniform torque and a constant speed, while operating with a wide range of joint angle.

As illustrated in FIGS. 1(a) and 1(b), a tripod constant velocity joint consists generally of a tripod housing 1' having a first rotating shaft 1" extending in a longitudinal axis direction (i.e., X-X axis direction) for transferring the torque of an engine through a coupling means (e.g., an external serration 1a') to transmit the engine torque T1 to a second rotating shaft 5' to drive the same. The tripod housing 1' includes three grooves 1b' to retain therein and guide a torque transmitting members of the second shaft 5' (e.g., three spherical rollers 2', a plurality of needle rollers 3') in order to accommodate smooth rotating of respective spherical roller 2' relative to a direction generally perpendicular to the longitudinal direction, namely, Y-Y axis direction shown in the drawings. Each spherical roller 2' is rotatably coupled to a spider 4' to transmit the torque to the shaft 5', and the spider 4' includes a boss portion 4a' with an internal serration 4b' to transmit the torque there-through, and three trunnions 4c' each extending radially from the boss portion 4a'. Each trunnions 4c' is coupled with a retaining outer 6' to retain the needle rollers 3' in the outer circumference of its corresponding trunnions 4c' of the spider 4', and a clip 7' mounted in the hole formed in the trunnions 4c' to support the retaining outer 6'.

In the tripod constant velocity joint shown in FIGS. 1(a) and 1(b), if the driving torque T1 from the engine of vehicle is transmitted via the external serration 1a' of the shaft 1", the torque T1 is transferred to the spherical roller 2' through the housing groove 1b'. As a result, a force F1 is applied between needle rollers 3' and trunnion 4c', in which the force F1 can be calculated by the equation of T/3PCR, where the PCR is a pitch circle radius of tripod housing groove 1b' that is measured from the center of the spider 4' or the first shaft 1" to the center of the housing groove 1b' as shown in the drawings. This force F1 produces a reaction torque T5 on the driven shaft 5' through the internal serration 4b' of spider 4' and the external serration 5a' of shaft 5'.

FIGS. 2(a) and 2(b) illustrate weak portions in the tripod joint which should be considered in the joint design in order to provide a tripod constant velocity joint having a desirable strength in terms of a torsional strength and a durability (or torsional fatigue) in particular. In the tripod joint design, the shortest or minimum diameter SD of shaft 5' is typically considered to be the weakest portion in design in terms of torsional strength, and the torsional strength is generally defined as the measured torsional strength when the joint breaks upon subjecting to a predetermined amount of force or torque. However, the compression stresses on the contact surface W1 between the spherical roller 2' and the guide groove 1b' of the housing, the contact surface W2 between the needle rollers 3' and the spherical roller 2', and the contact surface W3 between the spider trunnion 4c' and the needle rollers 3' can also be considered as weak portions affecting the joint life, namely, the durability or torsional fatigue which can be typically expressed as the torque to bring the flaking damage on the contact surfaces within the required or desired life of the vehicles. In addition, the bending stress on the root section W4 of spider trunnion 4c', the tensional stress on the section W5 from the concaved corner portion 4r' (between the root of trunnion 4c' and the adjoining boss portion 4a' of spider 4') to the major diameter SMD measured between two diametrically-opposite valley portions of internal serration 4b' of spider 4', and/or a hoop stress on the section W6 from the boss diameter SBD to the major diameter SMD of spider 4' are also known as main failure portions against the torsional fatigue upon subjecting to the oscillating sinusoidal torque which leads the joint to break.

As described, the strength of tripod joints is typically determined by the minimum diameter SD of shaft 5' because this portion is designed to break first for most torsional strength tests. Therefore, in the compact tripod joint design, the dimensions related to the above weak points should be considered to have the strength at least the same as or greater than the strength of the shaft 5' for the joint life test and torsional fatigue test.

With regard to the life of the joint which can be explained as a rotational durability of internal parts of the tripod joint for the required vehicle life, contact stresses between the spider trunnion, needle rollers, spherical roller, and groove surface of tripod housing should be considered. When the pitch circle radius PCR of the tripod joint is reduced to provide a more compact joint, the stresses between the internal parts of the joint become increased by the increase of the force F1 on the contact surfaces as the result of the reduction of the pitch circle radius PCR. Therefore, considering the stress increase between the internal parts, the limitation in the reduction of pitch circle radius PCR is another important factor for the design of compact tripod joint.

Regarding the torsional fatigue which is the joint durability against the repeatedly applying torque, the strength of spider should also be considered as an important factor. In order to obtain a compact design of the tripod joint by reducing the external diameter of tripod housing, the pitch circle radius PCR of the tripod housing should be reduced, and this results in the increase of the reaction force F1. However, as the increased force F1 cause to increase the bending stress on the root area W4 of the spider trunnion and tensional stress on the corner radius portion 4r' of the spider, the reduction of pitch circle radius RCR should be limited to a certain degree due to the stress requirements in the torsional fatigue tests of the tripod joint.

Moreover, in order to maximize the effect of the compact tripod joint design, due considerations should also be given to the reduction of key dimensions in other parts as well, such as the length of needle rollers and the width of the spherical roller, in addition to the reduction of the pitch circle radius of the joint. While reductions in the length of needle rollers and the width of spherical roller are necessary to reduce the external diameter of tripod housing, such reductions lead to the degradation of the stress requirements between the needle rollers and trunnion spider, the needle rollers and spherical roller, and also between the spherical roller and groove surfaces of the tripod housing. Therefore, an optimization in the relevant dimensions is very important to provide a compact tripod joint which is also durable with required strength.

SUMMARY OF THE INVENTION

Accordingly, in order to provide a compact tripod joint with the torsional strength and fatigue stress requirements equivalent to or more superior than that of conventional tripod joints, key dimensions and design factors of the components must be determined by studying the changes in stresses, for example, as the result of the reduction in the pitch circle radius PCR of tripod housing because it increases the reaction force F1. To design the compact tripod joint, the following descriptions provide analysis of stresses and suggest the relationship among key dimensions and associated ratios thereof.

In the design of the tripod constant velocity joints, the present inventors have recognized the following two types of contact patterns between housing groove 1b' and spherical roller 2', that are, the circular contact type and the angular contact type.

As shown in FIG. 3, the joint of circular contact type produces a contact point CP1 at the center line on the pitch circle radius PCR with the contact ratio TGR1/SRR of the curvature of groove surface TGR1 relative to the curvature SRR of the spherical roller 2', typically, greater than 1.01. While the circular contact type joint shown in FIG. 3 has advantages, for example, the potentials for reducing stresses at the edge portions 2a' of spherical roller 2', it also provides several disadvantages such as the concentration of stress at the central contact point CP1 located on the pitch circle diameter PCR. Thus, the central portions (CP1) of the spherical roller 2' and the housing grooves 1b' are subject to centralized stresses which may cause the reduction in the life of the joint as the repeated fatigue stresses are applied to the central point.

FIG. 3 illustrates a further analysis of contact ellipse CE1 and key dimensions for the joint design. The contact ellipse CE1 in the circular contact by the applied force F1 has a longitudinal length a1 in Y-Y axis direction and a widthwise length b1 in Z-Z axis direction. The two lengths a1 and b1 of contact ellipse CE1 are affected by the magnitude of force F1 and the ratio TGR1/SRR (i.e. the ratio between the curvature TGR1 of housing groove 1b' and the curvature SRR of spherical roller 2'). The center of contact ellipse is located in the contact point CP1 on the pitch circle radius PCR line of tripod housing 1' and the contact ellipse CE1 spread over the edge 2a' of spherical roller 2' in the direction of Y-Y axis. The areas EL1 of the contact ellipse CE1 beyond both edge 2a' of spherical roller 2' causes the increase in the contact stress by the loss of resultant contact areas. Even though the loss areas EL1 can be reduced by the increase of the ratio TGR1/SRR, there is also a limitation because the increase of ratio TGR1/SRR causes the increase in the contact stress on the contact center point CP1.

The other contact pattern is the angular contact with two contact ellipses produced at two points CP2 symmetrically displaced from the center point (on the pitch circle radius PCR) of the joint in the direction of contact angle θ, as illustrated in FIGS. 4(a) and 4(b) and described below in detail. The contact angle θ can be varied in consideration of the vibration concern and/or the strength targets. In general, the contact stresses in two contact surfaces can be calculated by the analysis of the contact force F1 and the areas of contact ellipses. While the angular contact type may produce disadvantages, for example, such as the production of larger stresses at the edges 2a' of spherical roller 2' due to the loss of contact areas by cutting the contact ellipses, it can, however, provide substantial advantages, such as the distribution or decentralization of stresses toward two displaced points CP2 instead of one contact point CP1 as in the circular contact pattern shown in FIG. 3.

Accordingly, the present invention is contemplated to provide a tripod constant velocity joint which is compact in design, reliable in structure, and also durable while satisfying the desired torsional strength requirements and fatigue requirements of the joints. In the present invention as illustrated and described below in association with preferred embodiments thereof, the angular contact type joint is selected for the tripod constant velocity joint of the present invention in which the joint is specifically devised to have a compact design, reliable construction, and durable structure while also avoiding the disadvantages of the circular contact type joint described above.

According to one preferred embodiment of the present invention, the tripod constant velocity joint for a drive system comprises: a tripod housing coupled to the first rotating shaft and having a plurality of guide grooves therein, each guide groove extending in an axial direction of the tripod housing; a spider coupled to the second rotating shaft and having a plurality of trunnions, each trunnion positioned in a corresponding guide groove of the tripod housing; and a spherical roller disposed between the trunnion and the guide groove of the tripod housing, and a plurality of needle rollers disposed between the trunnion and spherical roller. Each spherical roller is in angular contact with the guide groove of the tripod housing with two contact points displaced relative to a pitch circle diameter line of the tripod housing. The ratio of the length (CL) between two contact points of tripod housing groove to the length (SL) between two edges of spherical roller is preferably in a range between about 0.5 and about 0.85, and the ratio of the radius (TGR2) of the guide groove of the tripod housing to the radius (SRR) of the spherical roller is preferably in a range between about 1.1 and about 1.4.

The ratio of the length (NL) of the needle roller to a trunnion diameter (STD) of the spider is preferably in a range from about 0.5 to about 0.6. The ratio of the trunnion diameter (STD) of the spider to a pitch circle radius (PCR) of the joint is preferably in a range from about 0.85 to about 0.95.

BRIEF DESCRIPTION OF THE DRAWINGS

The above described and other objects, features and advantages of the present invention will be more apparent from the presently preferred embodiments of the invention disclosed in the following description and illustrated in the accompanying drawings, in which.

DETAILED DESCRIPTION OF THE INVENTION

Figure 1A:
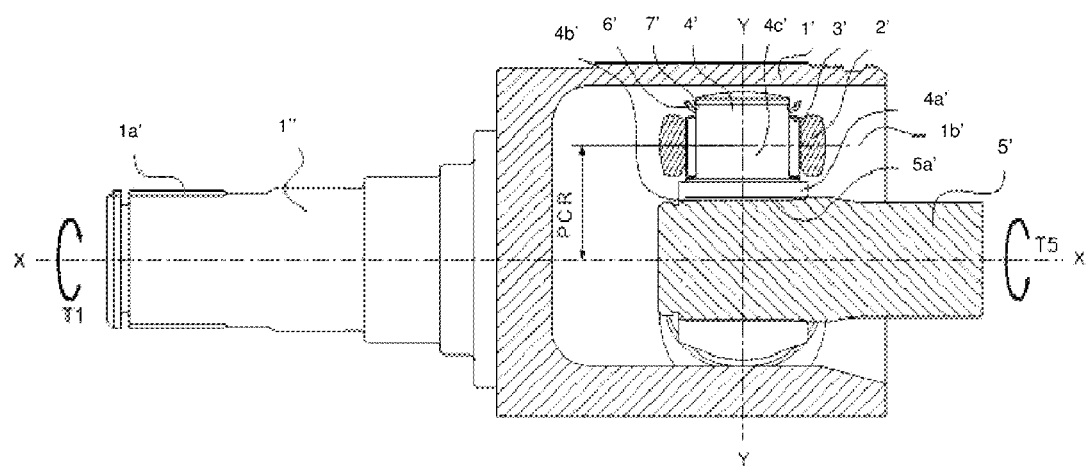
FIG. 1(a) is a partially cross-sectional view illustrating an exemplary structure of a conventional tripod type constant velocity joint.
Figure 1B:
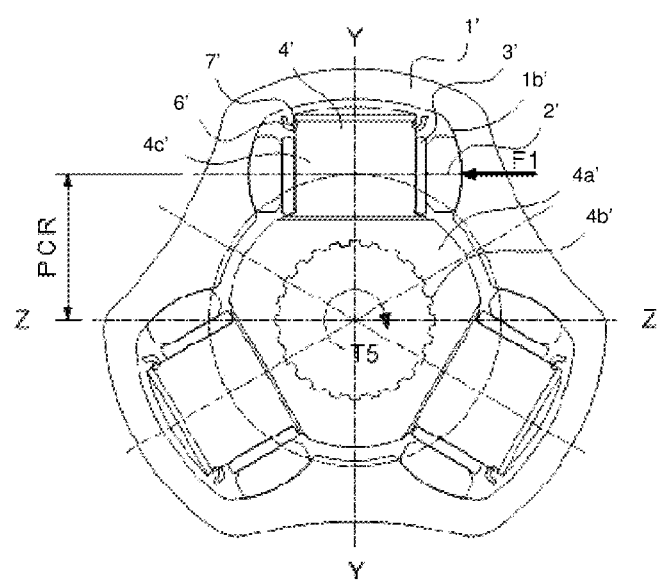
FIG. 1(b) is a partially cross-sectional view of the conventional tripod type constant velocity joint as shown in FIG. 1.

Referring to FIGS. 4(a) to 8(b) of the drawings, the tripod type constant velocity joints of the present invention are described herein in detail in association with exemplary or preferred embodiments thereof. However, the following descriptions of such embodiments are intended primarily for illustrating the principles and exemplary constructions of the constant velocity joints of the present invention, and the present invention is not specifically limited to these exemplary embodiments. Thus, one skilled in the art can appreciate or recognize that various modifications and substitutions can be made thereto without departing from the spirit and scope of the present invention. Throughout the disclosure, the same or similar elements and portions thereof are referred and described with the same reference characters for the simplicity and illustrative purposes.

Figure 3:
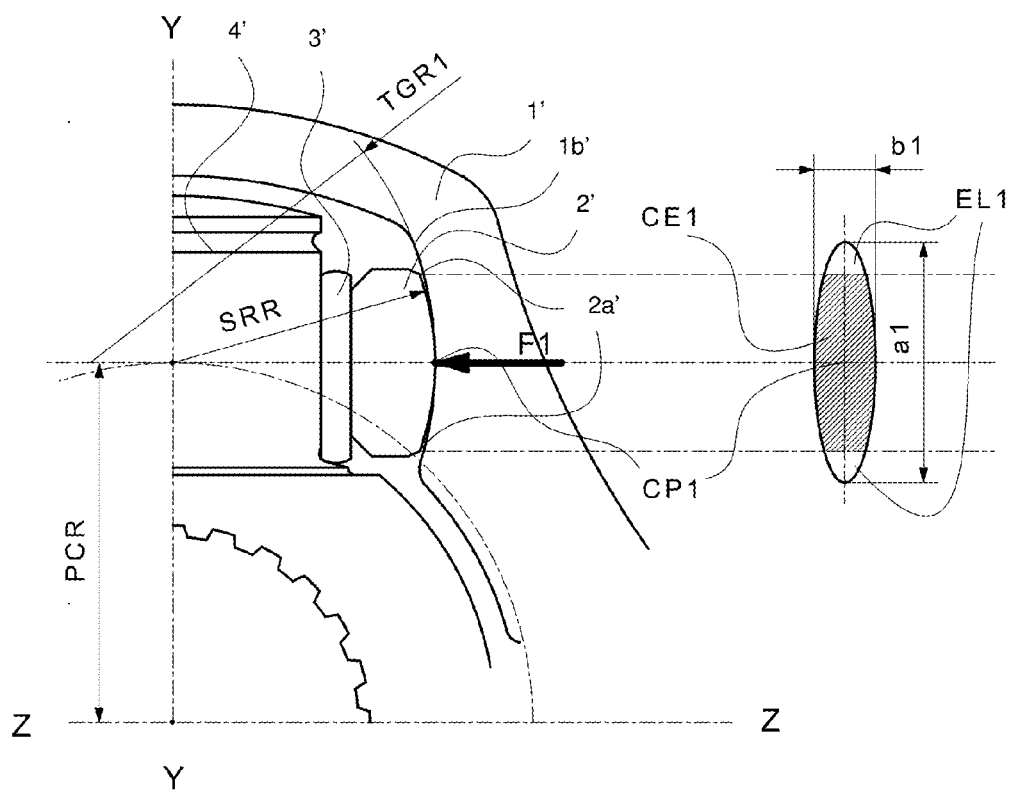
FIG. 3 shows a partially cross-sectional view of the constant velocity joint of circular contact type and its contact ellipse for illustrating a stress analysis for designing the tripod joint.
Figure 4A:
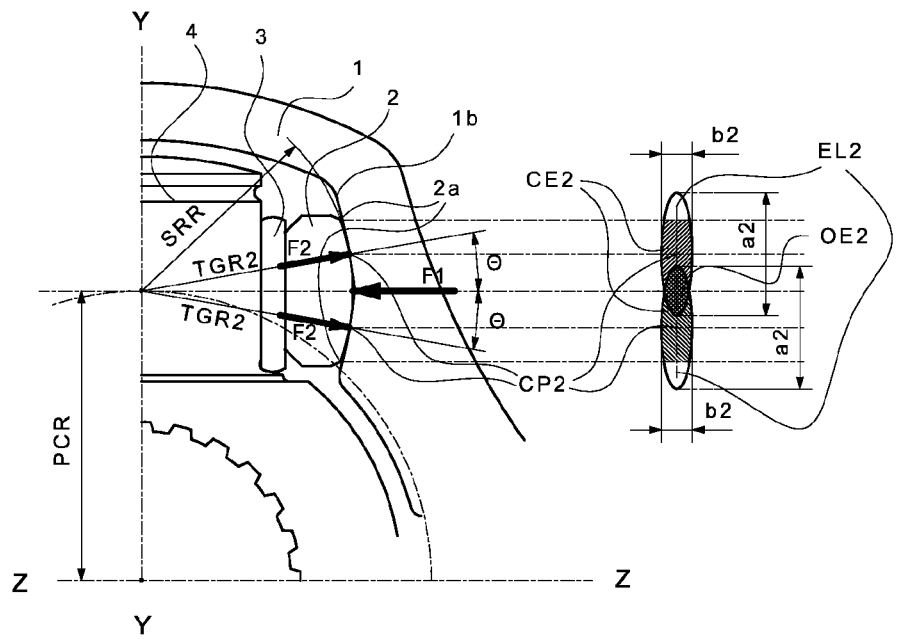
FIG. 4(a) shows a partially cross-sectional and schematic illustration of the constant velocity joint of angular contact type, according to the present invention, and its contact ellipse for illustrating a stress analysis for designing the tripod joint.

With reference to FIG. 4(a), the angular contact pattern of the tripod joint of the present invention is described herein below. With the angular contact, two contact ellipses CE2 are provided between the spherical roller 2 and tripod housing 1 when the force F1 is applied to transmit the rotational torque between the rotating shafts (see FIG. 1(a), for example). As the force F1 is applied, two reaction forces F2 are generated on two angularly spaced contact points CP2. The magnitude of reaction force F2 is reduced to F1 cos Θ/2 as the angular contact has two contact points CP2. This two-point contact makes two contact ellipses CE2 with smaller longitudinal length a2 in Y-Y direction and widthwise length b2 in Z-Z direction than the two lengths a1, b1 on the circular contact pattern shown in FIG. 3. In this angular contact pattern, the loss of contact ellipses EL2 extending beyond both edges 2a of spherical roller 2 will be increased, and the overlapped area OE2 between the two contact ellipses CE2 may, depending on the design of the joint, result in the increase of the contact stress on the center line on the pitch circle radius PCR, comparing to the circular contact pattern shown in FIG. 3. However, comparing to the circular contact pattern, the distribution of stress in the angular contact can easily be obtained by the appropriate selection of the position of contact points CP2 and ratio TGR2/SRR of the curvatures between tripod housing groove 1b and spherical roller 2. In addition, according to the present invention, the stress concentration on the center line (PCR) can also be restricted or controlled to be within the predetermined strength requirements of the spherical roller 2 and the tripod housing 1.

As described, the angular contact pattern as shown in FIG. 4(a) is chosen in this invention because there is no method to reduce the concentrated stress on the central contact point CP1 in the circular contact pattern shown in FIG. 3 if the pitch circle radius PCR is to be reduced while transferring the given torque of the engine. Even though the stress concentration can be optimized by the two point contacts in the angular contact pattern in FIG. 4(a), it may still have a drawback due to the generation of a larger stress on the edges 2a of spherical roller 2 by the loss of peripheral contact areas EL2 of the spherical roller 2. This can cause a vibration concern due to the potential damage on the groove 1b of tripod housing 1 by the frictional contact of the edges 2a against the housing groove 1b. According to the present invention, the stress on the edge 2a of spherical roller 2 can be reduced or minimized by selecting specific design factors and important dimensions of the components of the tripod joint as disclosed below, while also enabling the compact design of the joint with angular contact pattern.

Figure 4B:
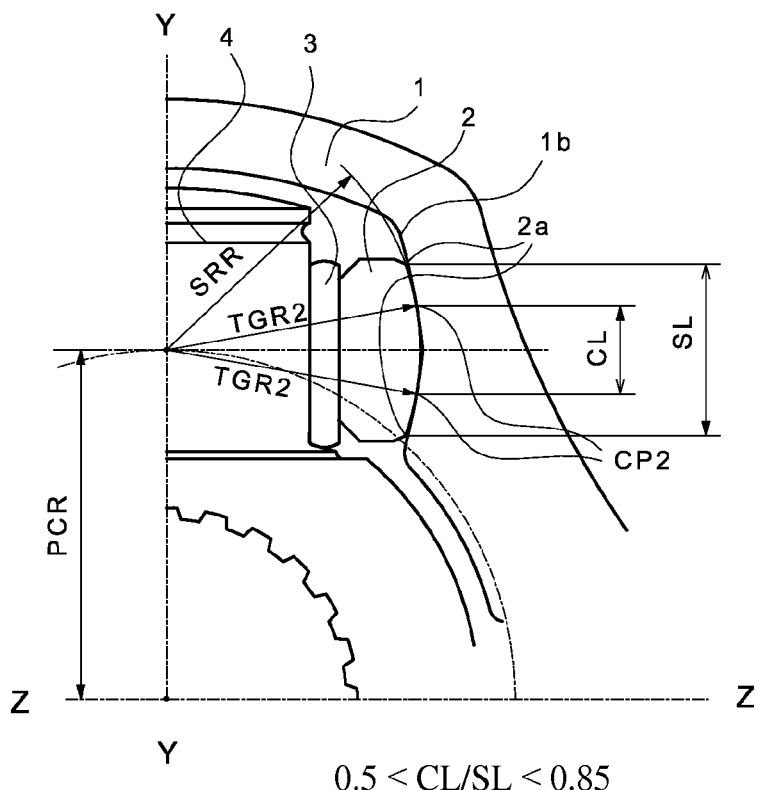
FIG. 4(b) is an enlarged, partially cross-sectional and schematic illustration of the constant velocity joint of FIG. 4(a), illustrating further important dimensions in the tripod joint design of the present invention.

FIG. 4(b) illustrates several important dimensions of the compact tripod joint of the present invention which has the angular contact pattern. Firstly, the ratio CL/SL of the length CL between two contact points CP2 of tripod housing groove 1b to the length SL between two contact edges 2a of spherical roller 2 is selected to be in the range from 0.5 to 0.85. If the ratio CL/SL is less than 0.5, it may cause an excessive stress concentration on the center portion (on the PCR line) by the overlap of two contact ellipses CE2. If this ratio CL/SL is greater than 0.85, it may cause inappropriate stress increase on both upper and lower edges 2a of spherical roller 2 by the loss of the contact ellipse portions.

The ratio TGR2/SRR of the radius TGR2 of the tripod housing groove 1b to the radius SRR of the spherical roller 2 is selected to be the same or greater than 1.05. More preferably, the ratio TGR2/SRR is selected to be in the range from 1.1 to 1.4. If the ratio TGR2/SRR is less than this range, it may unduly increase the loss of contact ellipses. If the ratio TGR2/SRR is greater than this range, it may cause an undue concentration of stress on contact points CP2.

Referring to FIGS. 5(a) to 6(c), the contact stresses among the spherical roller 2, needle rollers 3, and trunnion 4c of spider 4 are generated by the applied Force F1. To provide a compact tripod joint, it is generally necessary to reduce the width SW of spherical roller 2 and the length NL of needle rollers 3. However, these reductions can cause the increase of contact stresses among the internal parts in order to transmit the torque applied in the joint. Therefore, in consideration of such design concerns and limitations, the present invention provides further optimization in the key dimensions and appropriate ratios thereof upon specifically analyzing the contact stresses as well as the required strength and fatigue requirements of the joint components.

Figure 5A:
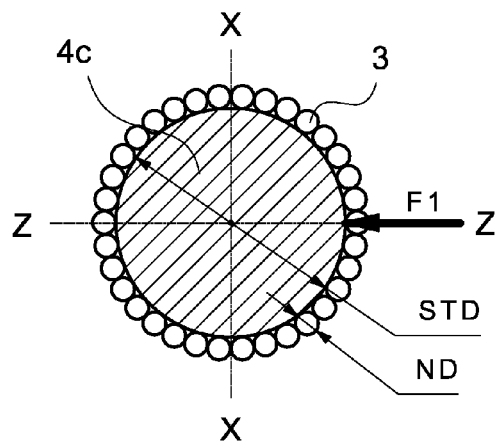
FIG. 5(a) is a cross-sectional and schematic illustration of the constant velocity joint of FIG. 4(a), illustrating further important dimensions in the tripod joint design of the present invention and also illustrating the convex contact between the trunnion and needle rollers.
Figure 5B:
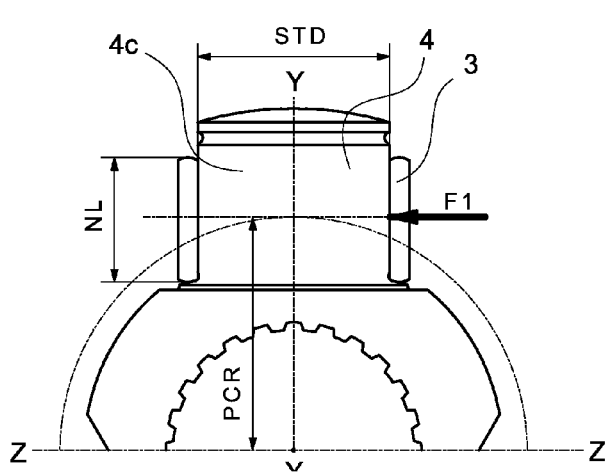
FIG. 5(b) is a partial schematic illustration of the constant velocity joint of FIG. 4(a), illustrating further important dimensions in the tripod joint design of the present invention.
Figure 5C:
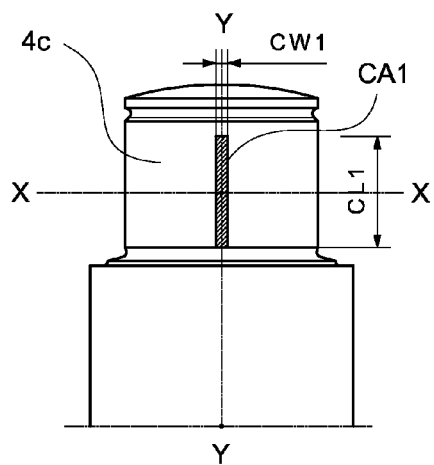
FIG. 5(c) is a right side view, in schematic illustration, of the trunnion of FIG. 5(b), illustrating the contact surface (CA1) between the trunnion and one of the needle rollers.

Referring now to FIGS. 5(a) to 5(c), the contact stress between the needle rollers 3 and trunnion 4c of spider 4 is affected by the contact area CA1 between the needle rollers 3 and trunnion 4c of spider 4 and force F1. The contact area CA1 has an actual contact length CL1 dictated by the overall length NL of needle roller 3, and the width CW1 which is related to the diameter ND of needle roller 3 and trunnion diameter STD of spider 4. According to the present invention, in order to reduce the length NL of needle rollers 3 without excessive stress generation, the trunnion diameter STD of spider 4 is increased, and as a result, the quantity (i.e., number) of needle rollers 3 is also increased while maintaining the diameter the same. This results in the enlargement of the contact width CW1 as the trunnion diameter STD and the quantity of the needle rollers 3 are increased. In the conventional tripod joint, the ratio NL/STD of the needle roller length NL to trunnion diameter STD of spider 4 ranges from 0.6 to 0.7. However, according to the tripod joint of the present invention, the ratio NUSTD is specifically selected to be in the range from 0.5 to 0.6 as the result of the increase in the trunnion diameter STD and the quantity of needle rollers 3. In a preferred embodiment of the invention, the quantity of needle rollers 3 is increased by one or two, which varies depending on the overall size and design of the tripod joints of the vehicle. Having the ratio NL/STD reduced, the tripod joint of the present invention has such advantage that it enables the reduction in the trunnion length and the height of spider as well as the external diameter of tripod housing. However, there is also a limitation in the reduction of this ratio (and the increase of the quantity of needle rollers as well) because it can be the reason to enlarge the outer diameter of spherical roller which can also cause the increase of the tripod housing volume. The above identified ratio of NL/STD and other design factors and ratios of the invention are selected in view of these design considerations.

Figure 6A:
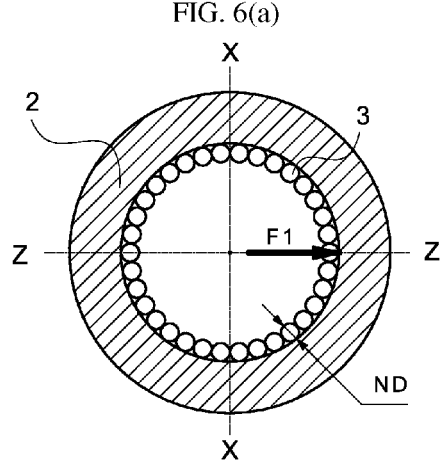
FIG. 6(a) is a cross-sectional and schematic illustration of the constant velocity joint of FIG. 4(a), illustrating further important dimensions in the tripod joint design of the present invention and also illustrating the concave contact between the spherical roller and needle rollers.
Figure 6B:
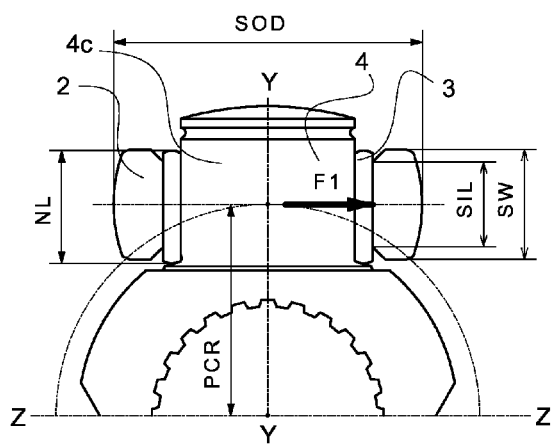
FIG. 6(b) is a partial schematic illustration of the constant velocity joint of FIG. 4(a), illustrating further important dimensions in the tripod joint design of the present invention.
Figure 6C:
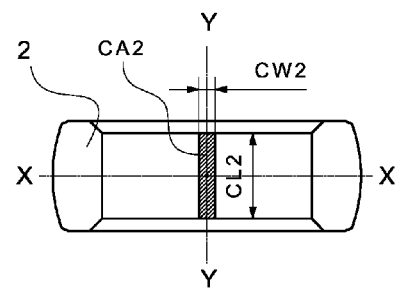
FIG. 6(c) is a cross-sectional and schematic illustration of the spherical roller of FIG. 6(b), illustrating the contact surface (CA2) between the spherical roller and one of the needle rollers.

FIGS. 6(a) to 6(c) illustrate the contact stress analysis of the invention, in particular, between the needle rollers 3 and the inner surface of spherical roller 2. As is similar to the spider trunnion 4c described above, the contact stress on the spherical roller 2 is affected by the force F1 and contact area CA2, in which the contact area CA2 has contact length CL2 and width CW2. However, while the convex outer surface of trunnion 4c contacts the needle rollers 3 as shown in FIG. 5(a), here the concave inner surface of spherical roller 2 contacts the needle rollers 3. Therefore, the contact stress on the spherical roller 2 will increase if the inner diameter of spherical roller 2 is increased by the increase of the size STD of spider trunnion 4c and the quantity of needle rollers 3, which is contrary to the stress between the needle rollers 3 and spider trunnion 4c which is reduced by the increase in the size STD of spider trunnion 4c and the quantity of needle rollers 3.

However, because at the given force the contact stress on the concave surface is smaller than that on the convex surface according to the contact theory, the contact stress between the needle rollers 3 and spherical roller 2 becomes smaller than that between the needle rollers 3 and trunnion 4c if the contact lengths CL1, CL2 are the same for both. Therefore, it's more important to keep the contact length SIL on the inner diameter of spherical roller 2, similar to the contact length CL1 between the needle rollers and trunnion. In consideration of these design factors, the ratio SIL/NL of the length SIL of inner diameter of spherical roller 2 to the length NL of needle rollers 3 is selected to be equal or greater than 0.9, according to one preferred embodiment of the present invention.

In addition, as the length NL of needle rollers 3 and the width SW of spherical roller 2 are reduced, the ratio SW/SOD of the width SW to the outer diameter SOD of spherical roller 2 is also reduced in order to provide a compact tripod joint. Preferably, the ratio SW/SOD is selected to be in the range from about 0.25 to about 0.35, which is smaller than the ratio SW/SOD for the conventional tripod joints that is typically greater than 0.35.

Figure 7A:
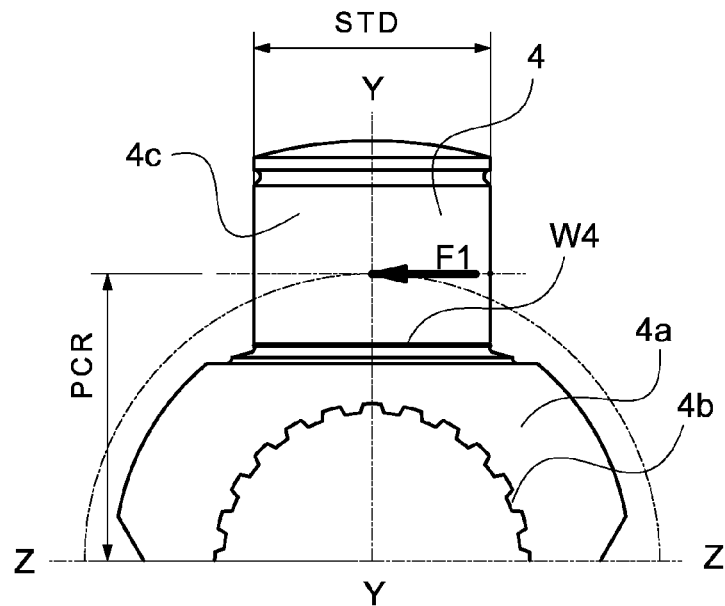
FIG. 7(a) is a partial schematic illustration of the constant velocity joint of FIG. 4(a), illustrating further important dimensions or design factors in the tripod joint design of the present invention.

FIGS. 7(a) to 8(b) illustrate the stress analysis of the present invention, in particular, on the spider 4 by the application of force F1. There are typically three main concerns in the stress analysis of the spider design. The first one is the bending stress on the bottom plane W4 of trunnion as shown in FIG. 7(a). The bending stress of this portion is related to force F1 and the size of the sectional area in the bottom plane W4 between the trunnion 4c and boss portion 4a. Therefore, the pitch circle radius PCR and trunnion diameter STD of spider 4 are key factors for determining this bending stress. In the compact tripod joint of the present invention, the pitch circle radius PCR is reduced relative to the conventional tripod joints. Thus, the reduced pitch circle radius PCR causes the increase of stress as the force F1 is increased as the result of reduction in the pitch circle radius PCR. To get the stress level equivalent to the conventional tripod joints, it is necessary to enlarge the sectional area W4 by increasing the trunnion diameter STD. In typical conventional tripod joints, the ratio STD/PCR of the trunnion diameter STD to the pitch circle radius PCR ranges from 0.75 to 0.85. However, according to one preferred embodiment of the tripod joint of the present invention, the ratio STD/PCR is specifically selected to be in the range from about 0.85 to about 0.95. With this and other design configurations disclosed in the descriptions of the invention, the tripod joint of the present invention can be made more compact in design, and is also durable and satisfies the torsional strength requirements and fatigue requirements of the tripod joint.

Figure 2A:
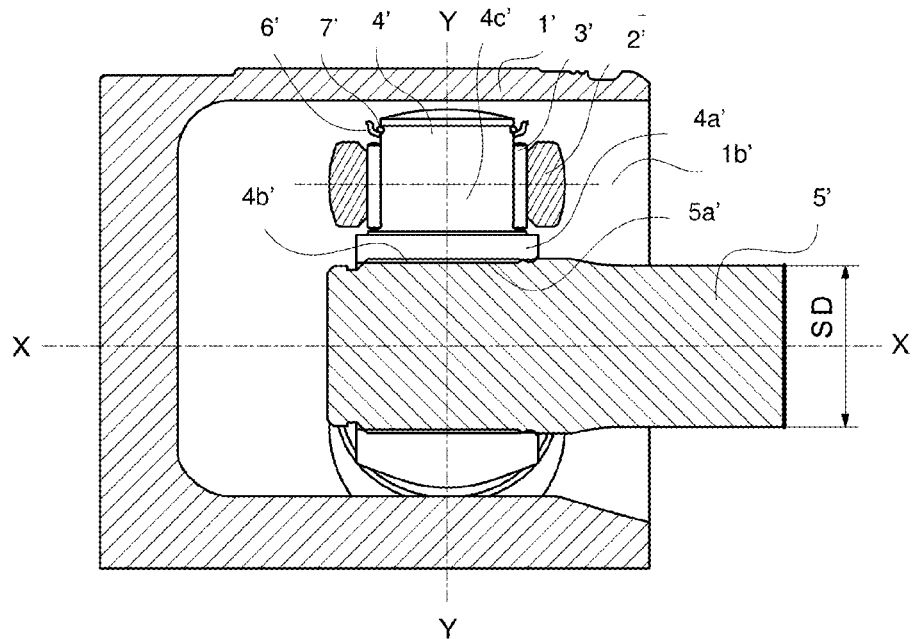
FIGS. 2(a) and 2(b) are views similar to FIGS. 1(a) and 1(b), respectively, and illustrate major dimensions in design and weak portions of the conventional tripod type constant velocity joint.
Figure 2B:
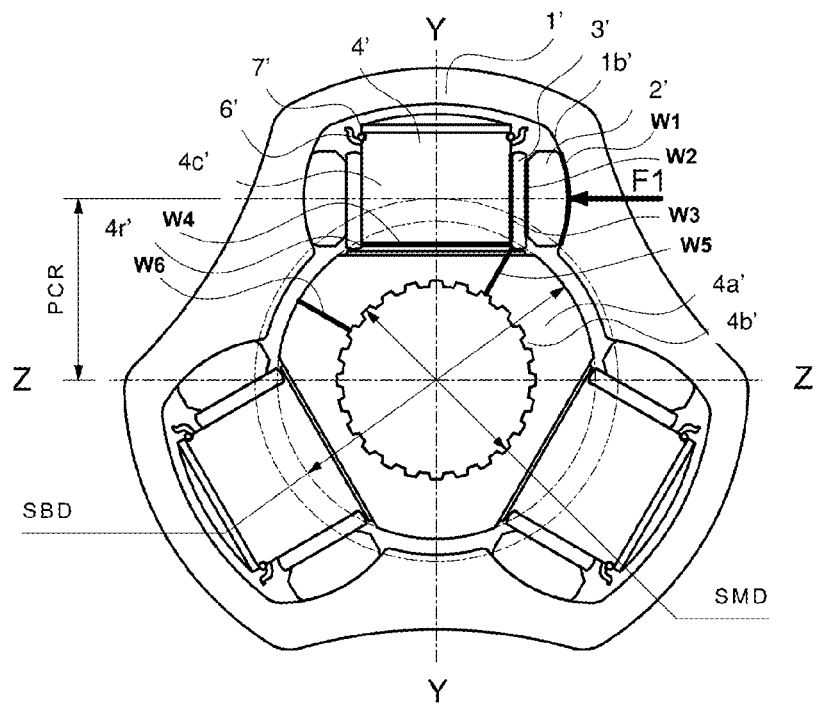
Figure 7B:
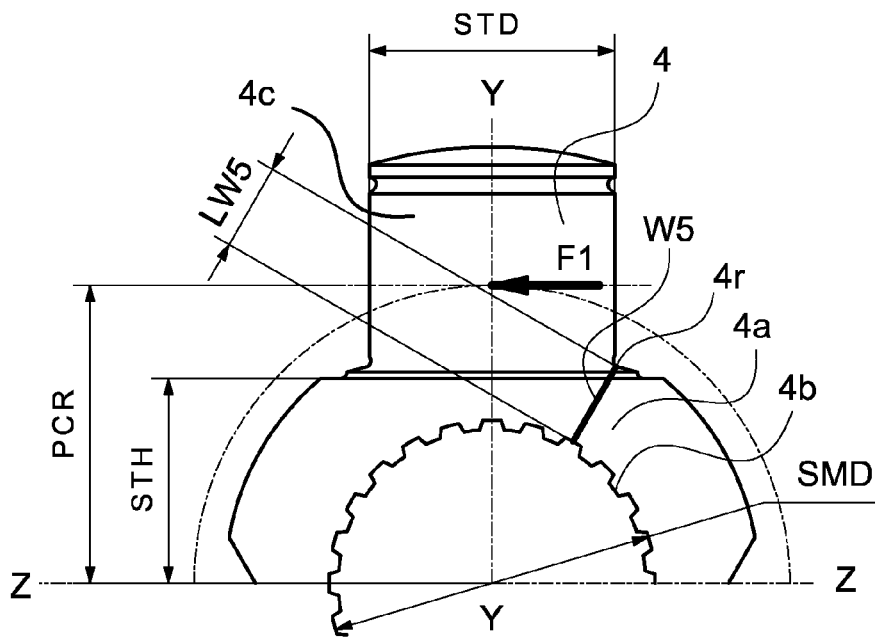
FIG. 7(b) is a partial schematic illustration of the constant velocity joint of FIG. 4(a), illustrating further important dimensions or design factors in the tripod joint design of the present invention.

In addition, another design factor considered for the spider design is the shortest linear length LW5 between the major diameter SMD of internal serration 4b of spider 4 and corner radius portion 4r, shown in FIG. 7(b). The major diameter SMD of internal serration 4b of the tripod joint of the present invention is typically the same as that of the conventional tripod joint because the major diameter SMD of the internal serration 4b of spider 4 is generally standardized depending on the required amount of torque to be applied and selected to match with the dimension of external serration 5a of the second rotating shaft 5 (shown in FIG. 1(a)) which is chosen to correspond to the minimum diameter SD of shaft 5 shown in FIG. 2(a). Therefore, the height STH of the root of trunnion 4c and trunnion diameter STD are important dimensions for tensional stress on this section W5. In order to provide a compact design, in the present invention the height STH of the root of trunnion 4c is reduced relatively to that of the conventional tripod joints. This may cause to increase the tensional stress on section W5 due to the reduction of length LW5. However, in the present invention, this disadvantage is compensated by the increase of trunnion diameter STD. While the ratio STH/STD of the trunnion root height STH to trunnion diameter STD on the spider 4 ranges from 0.85 to 0.95 for the conventional tripod joints, the ratio STH/STD is selected to be in the range from about 0.75 to about 0.85 for the compact tripod joint of the present invention. In addition, the ratio STD/SMD of the trunnion diameter STD to the major diameter SMD of serration 4b is selected to be in the range from about 0.77 to about 0.82, which ratio is less than that of the conventional tripod joints having the range from 0.85 to 0.90.

Figure 8A:
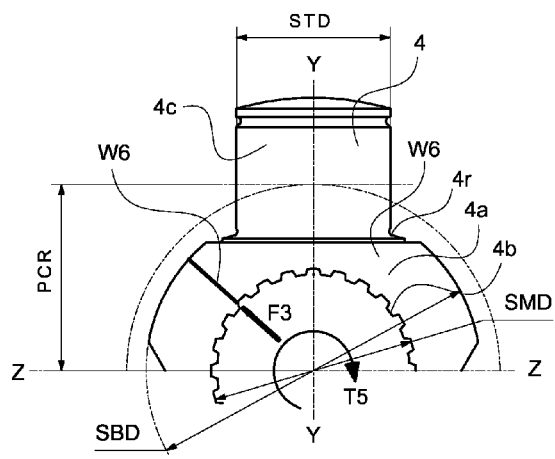
FIG. 8(a) is a partial schematic illustration of the constant velocity joint of FIG. 4(a), illustrating further important dimensions or design factors in the tripod joint design of the present invention.
Figure 8B:
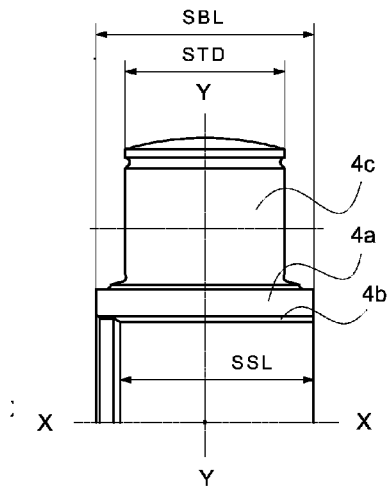
FIG. 8(b) is a partially cross-sectional and schematic illustration of FIG. 8(a), illustrating further important dimensions or design factors in the tripod joint design of the present invention.

With reference to FIGS. 8(a) and 8(b), further factors for the spider design are described herein. If the torque T5 is applied from the external serration of shaft 5 to the internal serration 4b of spider 4, a force F3 is generated on the contact points between the two serrations in radial direction of spider serration 4b and this causes a hoop stress on the section W6 of spider boss 4a shown in FIG. 8(a). The hoop stress is related to the major diameter SMD and the pitch circle diameter of the internal serration 4b, a pressure angle of the serration, boss diameter SBD and length SSL of the serration, as shown in FIGS. 8(a) and 8(b). Among these factors, the major diameter SMD, the pitch circle diameter, and the pressure angle have fixed values if the serration of same dimension is used for the tripod joints. Therefore, the hoop stress is affected by the sectional area W6, and thus, determined by the boss diameter SBD and the serration length SSL of spider 4. As the trunnion diameter STD is increased in the present invention, the boss diameter SBD needs to be also enlarged. As a result, to provide a compact design for the spider, the length of serration SSL of the spider 4 is reduced in the present invention. In the conventional tripod joints, the ratio SMD/SBD of the major diameter SMD to the boss diameter SBD ranges typically from 0.59 to 0.62. However, in the compact tripod joint of the present invention, the ratio SMD/SBD is selected to be in the range from about 0.55 to about 0.58. The length of serration SSL can be represented by the ratio STD/SBL of the trunnion diameter STD to the boss length SBL of spider 4. While the ratio STD/SBL is in the range from 0.67 to 0.75 for the conventional tripod design, the ratio STD/SBL is selected to be in the range from about 0.76 to about 0.80 in the compact tripod joint of the present invention.

Figure 9:
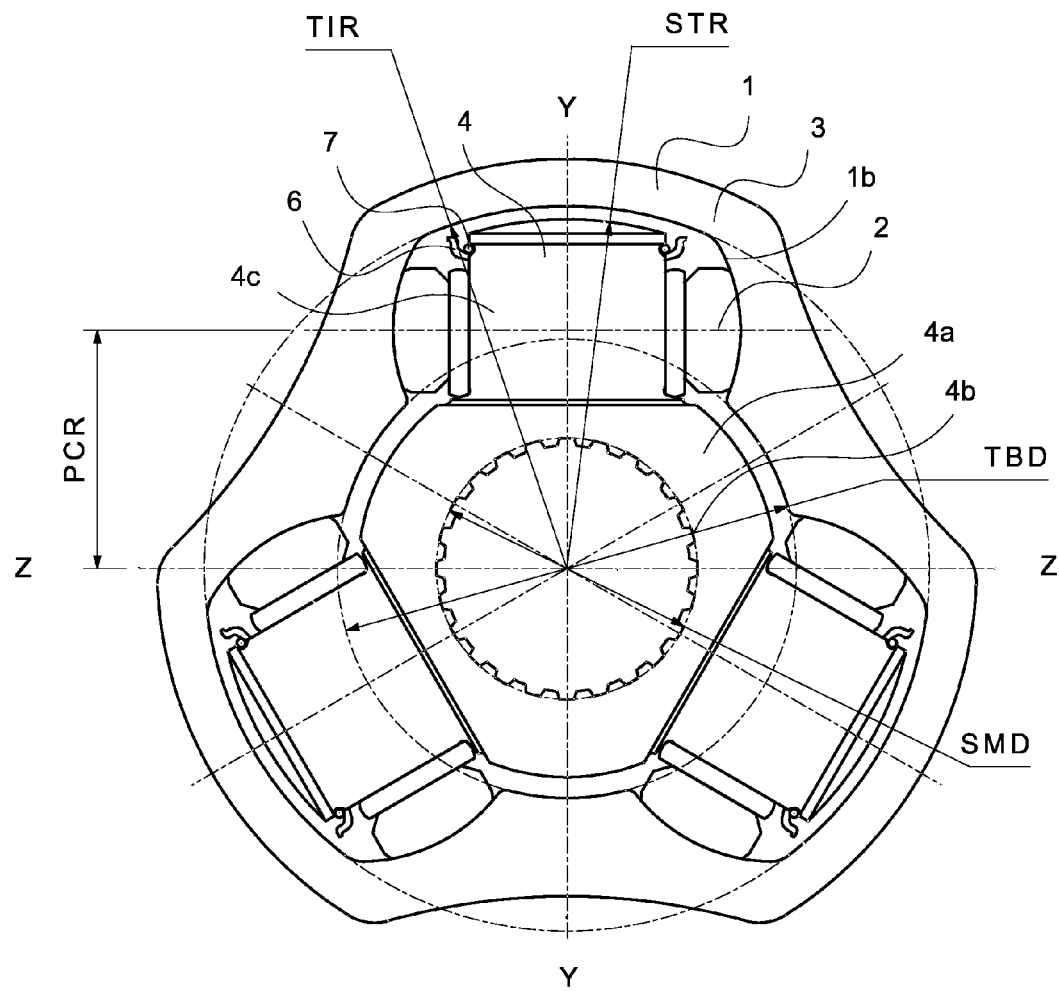
FIG. 9 is a view similar to the constant velocity joint of FIG. 4(a), illustrating further important dimensions or design factors in the tripod joint design of the present invention.

With reference to FIG. 9, further factors for the spider design of the present invention are described herein. These factors are from consideration of the above described factors and their relations dictated by the stress analyses and clearance studies among the components. According to preferred embodiments of the invention, the ratio SMD/PCR of the major diameter SMD of spider 4 to the pitch circle radius PCR is selected to be in the range from 1.10 to 1.20. The ratio SMD/STR of the major diameter SMD of spider 4 to the outer radius STR of trunnion 4c is selected to be in the range from 0.76 to 0.82. The ratio SMD/TBD of the major diameter SMD of spider 4 to the bore diameter TBD of tripod housing 1 is selected to be in the range from 0.51 to 0.53. The ratio SMD/TIR of the major diameter SMD of spider 4 to the internal radius TIR of the tripod housing groove 1b is selected to be in the range from 0.73 to 0.77. With the above described design configurations, the tripod joint of the present invention can be made more compact in design, and is also durable and satisfies the torsional strength requirements and fatigue requirements of the tripod joint.

As described above in connection with several exemplary embodiments thereof, the present invention is contemplated to provide a tripod constant velocity joint which is compact in volume, reliable in structure, and also durable while satisfying the desirable torsional strength requirements and fatigue requirements of the joints. In the present invention as illustrated and described, the angular contact type joint is selected for the tripod constant velocity joint of the present invention in which the joint is specifically designed to have a compact volume, reliable construction, and durable structure while enhancing the advantages of the angular contact type joint and while also reducing the disadvantages of the circular contact type joint described above.

The above disclosed embodiments of the invention are representatives of a presently preferred form of the invention, but are intended to be illustrative rather than definitive thereof. Accordingly, those skilled in the art will appreciate or recognize that various modifications and substitutions can be made thereto without departing from the spirit and scope of the present invention as set forth in the appended claims.

What is claimed is:

1. A constant velocity joint for a drive system having a first rotating shaft and a second rotating shaft, the constant velocity joint comprising:
a tripod housing coupled to the first rotating shaft, the tripod housing having a plurality of guide grooves therein, the guide grooves extending in an axial direction of the tripod housing and spaced equally apart in a circumferential direction of the tripod housing;
a spider coupled to the second rotating shaft, the spider having a plurality of trunnions, each trunnion positioned in a corresponding one of the guide grooves of the tripod housing; and
a spherical roller disposed between each trunnion and its corresponding guide groove of the tripod housing for transmitting a torque between the first and second rotating shafts, and a plurality of needle rollers disposed between each trunnion and each spherical roller;
wherein each spherical roller is in angular contact with its corresponding guide groove of the tripod housing with two contact points displaced symmetrically relative to a pitch circle diameter line of the tripod housing;
wherein a ratio of a length (CL) between two contact points of tripod housing groove to a length (SL) between two edges of spherical roller is in a range from 0.5 to 0.85;
wherein a ratio of a radius (TGR2) of the guide groove of the tripod housing to a radius (SRR) of the spherical roller is in a range from 1.1 to 1.4;
wherein a ratio of a length (NL) of the needle roller to a trunnion diameter (STD) of the spider is in a range from 0.5 to 0.6.

2. The constant velocity joint as claimed in claim 1, wherein a ratio of a length (SIL) of an inner surface portion of the spherical roller to a length (NL) of the needle roller is equal to or greater than 0.9.

3. The constant velocity joint as claimed in claim 1, wherein a ratio of a width (SW) of the spherical roller to an outer diameter (SOD) of the spherical roller is in a range from 0.25 to 0.35.

4. The constant velocity joint as claimed in claim 1, wherein a ratio of a trunnion root height (STH) to a trunnion diameter (STD) of the spider is in a range from 0.75 to 0.85.

5. The constant velocity joint as claimed in claim 1, wherein a ratio of a trunnion diameter (STD) of the spider to a major diameter (SMD) of an internal serration of the spider is in a range from 0.77 to 0.82.

6. The constant velocity joint as claimed in claim 1, wherein a ratio of a major diameter (SMD) of an internal serration of the spider to a boss diameter (SBD) of the spider is in a range from 0.55 to 0.58.

7. The constant velocity joint as claimed in claim 1, wherein a ratio of a trunnion diameter (STD) of the spider to a boss length (SBL) of the spider is in a range from 0.76 to 0.80.

8. The constant velocity joint as claimed in claim 1, wherein a ratio of a major diameter (SMD) of an internal serration of the spider to a pitch circle radius (PCR) of the joint is it a range from 1.10 to 1.20.

9. The constant velocity joint as claimed in claim 1, wherein a ratio of a major diameter (SMD) of an internal serration of the spider to an outer radius (STR) of the trunnion is in a range from 0.76 to 0.82.

10. The constant velocity joint as claimed in claim 1, wherein a ratio of a major diameter (SMD) of an internal serration of the spider to a bore diameter (TBD) of the tripod housing is in a range from 0.51 to 0.53.

11. The constant velocity joint as claimed in claim 1, wherein a ratio of a major diameter (SMD) of an internal serration of the spider to an internal radius (TIR) of the guide groove of the tripod housing is in a range from 0.73 to 0.77.

12. A constant velocity joint for a drive system having a first rotating shaft and a second rotating shaft, the constant velocity joint comprising:
- a tripod housing coupled to the first rotating shaft, the tripod housing having a plurality of guide grooves therein, the guide grooves extending in an axial direction of the tripod housing and spaced equally apart in a circumferential direction of the tripod housing;
- a spider coupled to the second rotating shaft, the spider having a plurality of trunnions, each trunnion positioned in a corresponding one of the guide grooves of the tripod housing; and
- a spherical roller disposed between each trunnion and its corresponding guide groove of the tripod housing for transmitting a torque between the first and second rotating shafts, and a plurality of needle rollers disposed between each trunnion and each spherical roller;

wherein each spherical roller is in angular contact with its corresponding guide groove of the tripod housing with two contact points displaced symmetrically relative to a pitch circle diameter line of the tripod housing;

wherein a ratio of a length (CL) between two contact points of tripod housing groove to a length (SL) between two edges of spherical roller is in a range from 0.5 to 0.85;

wherein a ratio of a radius (TGR2) of the guide groove of the tripod housing to a radius (SRR) of the spherical roller is in a range from 1.1 to 1.4;

wherein a ratio of a trunnion diameter (STD) of the spider to a pitch circle radius (PCR) of the joint is in a range from 0.85 to 0.95;

wherein a ratio of a length (NL) of the needle roller to the trunnion diameter (STD) of the spider is in a range from 0.5 to 0.6.

* * * * *